Nov. 8, 1932.　　　A. T. BOLTON　　　1,886,370
COMPUTING DEVICE
Filed May 31, 1928
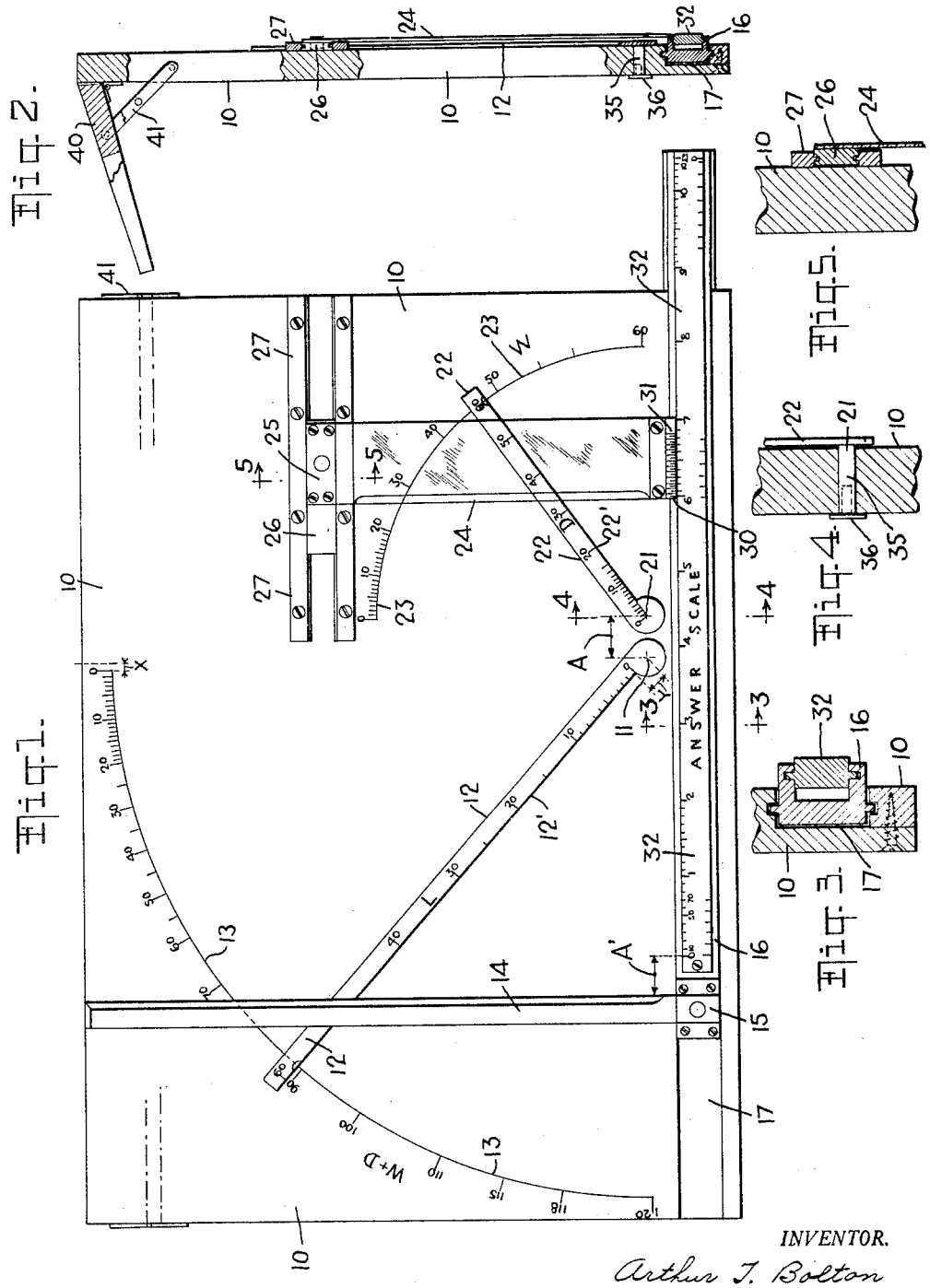

Patented Nov. 8, 1932

1,886,370

UNITED STATES PATENT OFFICE

ARTHUR T. BOLTON, OF PELHAM, NEW YORK

COMPUTING DEVICE

Application filed May 31, 1928. Serial No. 281,630.

This invention relates to computing devices and more particularly to devices adapted to compute resultant values which involve products and successive summations thereof to get a resultant by one set of operations.

The object of the invention is to provide a compact and reliable device of the character specified which is economical and readily manufactured and can be easily and accurately manipulated.

More specifically an object of the invention is to provide a computing device which is adapted to find successive products and sum the same to obtain a resultant value which may be operated upon again by a given value to get a final resultant.

It is also an object to provide means to compensate or amend a first resultant value with a desired addendum to obtain a corrected resultant.

A further object of the invention is to improve the device entitled "Product number indicator" disclosed in my United States Letters Patent No. 1,021,965, patented April 2, 1912 whereby the resultant values, which are obtained therefrom, can be modified and compensated for to meet a larger variety of conditions than was possible with my aforesaid "Product number indicator."

Other objects of the invention will in part be obvious and will in part appear hereinafter.

The invention accordingly comprises the features of construction, combinations of elements, and arrangement of parts, which will be exemplified in the constructions hereinafter set forth and the scope of the application of which will be indicated in the claims.

For a fuller understanding of the nature and objects of the invention, reference should be had to the following detailed description taken in connection with the accompanying drawing in which:

Figure 1 is a plan view of the computing device constructed in accordance with the invention:

Fig. 2 is an end elevation of the device shown in Fig. 1, parts being shown in section;

Fig. 3 is an enlarged fragmentary sectional view taken on the line 3—3 of Fig. 1;

Fig. 4 is a similar fragmentary sectional view taken on the line 4—4 in Fig. 1; and Fig. 5 is another fragmentary sectional view similar to Figs. 3 and 4, taken on the line 5—5 of Fig. 1.

Referring now to the drawing, 10 denotes a plane-table upon which the calculating instrumentalities of the present computing device are co-operatively disposed.

In order that the present device may compute additive products which have no common factor as a multiplier, it is desired to arrange the calculating instrumentalities to operate in accordance with the principle of proportional triangles, the resultant or additive value being read as a totality of lengths taken along corresponding sides of a plurality of triangles; there being two triangles in the present instance which are arranged to have these corresponding sides disposed adjacent to one edge of the table 10. The triangles arranged for achieving these computations are determined by swinging arms and movable bars, as described below.

To this end, table 10 has pivoted thereto, at 11, an arm 12 which has its lower edge 12' preferably cut back to correspond with a line passing through its pivot-point, which edge is designed to determine one side of the computing triangle. In order to find the position to which the arm 12 is to be turned, table 10 is provided with an arcuate scale 13 over which the free end of the arm passes. This scale is graduated to have readings which correspond with one of the factors entering into one of the products which it is desired to find. This graduation is preferably made in a manner adapted to facilitate the rapid computation of the particular problem for which the device is designed. The arm 12 is also graduated along its edge 12' so as to have readings corresponding to the other factor entering the product computed from the triangle, determined by the arm. The resultant product is given as a projection of a distance along the arm 12 for a given position thereof on scale 13, upon the horizontal side of the computing triangle. In order to determine this projection readily, a bar 14 having a straight edge which has parallel movement is provided. In order to insure this parallel movement the bar 14 is secured as indicated at 15 to a member 16, adapted to slide in a direction parallel to the horizontal side of the computing triangle; improper displacement of the member 16 is prevented by the provision of a groove 17 arranged parallel to the horizontal side of the computing triangle and formed near an edge of the table 10. Proper sliding engagement between member 16 and groove 17 is secured in any convenient manner, for example, by the employment of a tongue and groove construction, as illustrated in Fig. 3.

A second computing triangle is employed for finding a second product, this being here achieved by the provision of an arm 22 pivoted at 21 to the table 10 and having a graduated edge 22′ similar to that at 12′. The free end of the arm 22 passes over an arcuate scale 23, both the edge and scale being graduated to read the factors entering the second product. Hence this product is given as a resultant projection on the horizontal, in a manner similar to that for the first triangle.

The second triangle is provided on a scale proportional to the first triangle; i. e., if the products are of the same order, then the triangles have their scales in a one-to-one ratio; but if there is to be a given fixed factor in one of the products, this is included by taking one scale in a corresponding ratio to the other scale, as explained more fully below. Also in order that the projections may be summed the triangles are preferably arranged to have their vertices adjacent and when not coincident, then in a line parallel to the groove 17.

In order properly to project the product in the second triangle, a parallel-moving bar 24 having a straight edge is provided, the parallel movement in this case being secured independently of that of bar 14. As shown, this is achieved by securing the bar 24 at its upper end 25 to a sliding member 26 operating in grooved ways 27, which are secured on table 10. The displacement of the member 26 from the ways 27 is prevented in any convenient manner, for example, by a tongue and groove construction, as shown more clearly in Fig. 5.

In order to obtain readily the resultant of the projections from the two triangles a linear scale is provided to read the horizontal projections of the distances taken on the arms 12 and 22. This linear scale is preferably marked on the sliding member 16, as by this arrangement it permits the resultant sum of the projections in the two triangles to be read as a distance between the straight-edges of bars 14 and 24, which computing straightedges are here shown as disposed opposite to each other.

In my prior patent there are shown computing triangles having coincident vertices so that the resultant sum is read as the continuous horizontal distance between the points determining the ends of projections of distances on the swinging arms there employed. In the present arrangement, these vertices are preferably spaced apart by a fixed distance, denoted A on the drawing, in order that the arms 12 and 22 may have completely independent movement. In order properly to compensate for the displacement A between the vertices of the computing triangles, the zero of the scale on the member 16 is set back a corresponding distance from the computing edge of the bar 14, i. e., the zero of the scale on the member 16 begins at a distance denoted A′, which is equal to A, from the computing edge of bar 14.

The sum of the projections is ordinarily read at 30, a point of the scale on member 16 determined by the intersection of the computing edge of bar 24 with the linear scale. In order that this sum may be amended or corrected by an additive value, the bar 24 is provided with an additional scale 31 graduated to have additive or compensating readings and disposed on the end of bar 24 adjacent the scale on member 16 so that the resultant value is read not at point 30, but at a point corresponding to some point on the scale 31. The corrected resultant thus appears in the same units directly on the linear scale on member 16.

In order that the resultant given on the linear scale may be read in any one of a plurality of desired units, the sliding member 16 is provided with a second sliding member 32, shown in enlarged section in Fig. 3, secured in place by a tongue and groove construction. This second sliding member has graduated thereon a plurality of scales one of which is in register with the scale of member 16 so as to give the value of total projections on scale 16 as an equivalent reading in a desired unit on the scale on member 32. This latter member may be withdrawn and replaced so as to have any other scale which is graduated thereon in register, for reading purposes, with the scale on member 16.

Since accuracy is desired from the computing device of the present invention as well as facility of operation, the swinging arms 22 are preferably pivoted in the table 10 to have as little play as possible and for this purpose employ relatively large pivoting-columns, shown at 35, which pass completely through the table 10 and have large bearing screws 36 holding them in place, affixed on the underside of the table. In order that the table which would otherwise lie flat on a horizontal surface may not of itself always remain horizontal, but may be supported slightly inclined thereto so as to increase the facility with which it may be manipulated and inspected, the table 10 is preferably provided with a collapsible hinged extension 40, which may be set up at an angle thereto, as shown in Fig. 2, and is retained in place by a folding link 41.

The use to which the computing device of the present invention is to be put, in large measure determines the nature of the scales and graduations employed on the table and moving members. The nature of the device makes it particularly applicable to the computation of the price of the construction of packing and shipping boxes. As an example of the mode of operation in connection with the computation of the price of shipping boxes, the following is given:

Assuming that the maximum inside-length, width and depth of boxes, the price of which is to be computed, is sixty inches each, the arm 12 will have its computing edge 12' graduated to read sixty units over its working length. This scale may be designed to read the length factor in the products desired. As such, it is preferably marked with directing indicia to this end, for example the letter L may be impressed thereon.

In shipping and packing boxes, it is the inside dimensions that are generally measured although it is outside areas that are to be computed to find the price desired. The thickness of the lumber has of course to be added to an inside measurement. Where lumber of a standard thickness is employed, the inside length is compensated for on the scale on the edge 12' by displacing the "zero" of the scale a distance, equal to twice the thickness, radially away from the pivot-point 11. This compensates for the additional length necessary to overlap the thickness of the two ends of the box. This displacement is indicated on the drawing at $y$.

The length, read on the scale at 12', enters as a factor in the products representing the areas of four sides of a box, exclusive of the ends. The sum of these areas, it is seen, is had by multiplying the length by the sum of the width and depth taken twice. The sum of the width and depth is accordingly taken as the factor on the arcuate scale at 13 by which the value on the scale 12' is to be multiplied in order to give the desired resultant.

In order to have the factor two enter into the resultant and yet take but the sum of width and depth as the reading on the scale at 13, the graduation of this scale is made such as to include the factor two. This is accomplished by taking each scale division corresponding to one on the scale at 12' as two units, the graduations being laid off along a horizontal tangent to arc at 13, and then projecting on the arc. On this tangent, the length of which equals the radius of the arc, are laid off one-hundred-twenty units which when projected divide the arc into one-hundred-twenty units of varying length, but which determine the position to which arm 12 is to be moved for a particular value of the factor width plus depth.

To correct the inside measurements of width and depth so as to give correct values for the products desired, the graduation of this scale is also compensated for the thickness of the lumber by displacing the "zero" of the scale by a number of units which corresponds to twice the thickness of the lumber. The inside width plus twice the thickness added to the inside depth gives one-half the outside perimeter of the top, bottom and two sides of the box. In the scale on the drawing this displacement is to the left of the vertical radius of the arcuate scale 13 and is denoted at $x$. To indicate that the arcuate scale at 13 reads width plus depth it is preferably provided with suitable directing indicia, for example it has the letters "W+D" impressed adjacent thereto, as shown. Thus the sum of the products desired corresponds to a length of a projection on the horizontal, which for a given inside of a box having sides of a given width and depth, is found by moving the arm 12 to a point on the arcuate scale 13 such that the edge 12' intersects at the point giving a reading equal to the sum of the width and depth and then moving the straight edge 14 to cross the edge 12' at a point which corresponds to the inside length of the box. Hence the horizontal distance on the scale on member 16, from the straight edge 14 to the point thereon which is below the pivot-point 11 will represent the sum required. The scale on member 16 is graduated to give this sum in convenient units, for example in square inches, or square feet, preferably the latter.

It is convenient first to find the product representing the area of one end of the box and then multiply by two, obtaining a resultant projection in units of the same magnitude as employed in connection with the first triangle. This is accomplished here by graduating the scales on arm 22 and on the arc 23 each to read directly one of the factors of the product representing the end area, the units for these scales being so chosen that the product when projected onto the scale on member 16 is multiplied by two. Thus the scale on the arm 22 is graduated to have sixty units which are one-half the magnitude of the units on arm 12, and is chosen to represent the depth factor; it preferably has directing indicia thereon showing this, here indicated by an impressed letter "D."

The scale of arc 23 likewise has sixty units which are had by projecting thereon a distance, taken on a horizontal tangent, equal in length to the radius of the arc 23 divided into sixty equal units. The reading on the scale 23 is taken to represent the width factor, directing indicia being preferably affixed thereto showing this, here indicated by an impressed letter "W" adjacent the scale. Hence when the arm 22 is moved to a point on the arcuate scale representing the given width, and the straight edge of bar 24 moved to intersect the scale on arm 22 at a point representing the given depth, the resultant horizontal projection corresponding to the sum of the products giving the two end-areas, which projection is added to the former to give the area of the six faces of the box as a reading on the scale member 16. This is ordinarily determined at point 30 by the straight edge of bar 24, the displacement of the vertices of the triangles by the distance A' being compensated for by the distance A' as hereinbefore noted. No compensation in this second sum is made for lumber thicknesses, so that the "zero" of the scale on arm 22 is at the pivot point and the "zero" of the scale on arm 33 is on the vertical radius.

Where the resulting reading is to be corrected by a value representing the increased amount of lumber incident to the use of battens in the construction of boxes, this is obtained from a reading had from the scale 31. Battens in such instances generally comprise lumber of definite width and thickness, applied in a uniform manner to the ends of the boxes. When so applied, the increased amount of lumber is determined by the width and depth of the boxes. Consequently the scale 31 may be graduated so as to give the proper addendum on the scale on the sliding member 16 for battens of a particular width, for example, the scale at 31 may be graduated to give points corresponding in inches to the combined width plus depth of the boxes, which determine points on the scale on member 16 giving a reading in square feet to be added; this scale being for battens of a particular width, for example, three inches wide. Different scales, of course, would be affixed to the bar 24 if battens 3½ or 4 inches wide were used, as will be readily understood.

Where it is desired to compute the price of the construction of boxes, adjacent scale on member 32 is graduated to show directly the product of the resultant square feet by the price per square foot, so as to give the final resultant price of the box. Other scales on member 32 would of course be used to show the price when computed at a different rate.

Since certain changes may be made in the above construction and different embodiments of the invention could be made without departing from the scope thereof, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which as a matter of language might be said to fall therebetween.

Having described my invention, what I claim as new and desire to secure by Letters Patent, is:

1. In a computing device, in combination, a table, a pair of arms pivoted thereto having their pivot-centers adjacently disposed and spaced a fixed distance apart, arcuate scales on said table cooperating with the free ends of said arms, a linear sliding member parallel to a line passing through said pivot-centers, a pair of parallel moving bars, one associated with each of said arms, said bars being disposed vertically to said linear sliding member, and a scale member associated with said linear sliding member and having the "zero" mark displaced thereon to compensate for the fixed distance between said pivot-centers, whereby said sliding member with its associated scale is adapted to give a resultant reading which is the sum of the projections of distances measured along said arms.

2. In a computing device, in combination, a table, a pair of arms pivoted thereto having their pivot-centers adjacently disposed and spaced a fixed distance apart, arcuate scales on said table cooperating with the free ends of said arms, a sliding member having a linear scale associated therewith and disposed to slide along a line parallel to a line passing through said pivot-centers, a bar secured to said slide having a straight edge vertically disposed to said linear scale and associated with the free end of one of said arms, a second bar arranged to slide independently of the first said bar, said second bar having a straight edge adapted to be at all times parallel to the first said bar, said linear scale having the "zero" mark displaced from the straight edge of said first named parallel bar, a distance adapted to compensate for the fixed distance between said pivot-centers.

3. In a computing device, in combination, a table, a pair of arms pivoted thereto having their pivot-centers adjacently disposed and spaced a fixed distance apart, arcuate scales on said table cooperating with the free ends of said arms, a sliding member on said table having a linear scale associated therewith disposed adjacently to said pivot-centers and arranged to slide along a line parallel to the line of said pivot-centers, a bar secured to said sliding member and having a straight edge disposed vertically to said linear scale and arranged to cooperate with one of said arms, a second sliding member disposed above the other of said arms and adapted to slide along a line parallel to the first said sliding member, and a second bar secured to said second sliding member and having a straight edge associated with the other of said arms, said straight edge extending downwardly to meet said first named sliding member and scale and adapted to determine a point on said linear scale which is the resultant sum of the projection of distances along said arms on said linear scale.

4. In a computing device, in combination, a table, a pair of arms pivoted thereto having their pivot-centers adjacently disposed and spaced a fixed distance apart, arcuate scales on said table cooperating with the free ends of said arms, a sliding member on said table having a linear scale associated therewith disposed adjacently to said pivot-centers and arranged to slide along a line parallel to the line of said pivot-centers, a bar secured to said sliding member and having a straight edge disposed vertically to said linear scale and arranged to cooperate with one of said arms, a second sliding member disposed above the other of said arms and adapted to slide along a line parallel to the first said sliding member, a second bar secured to said second sliding member and having a straight edge associated with the other of said arms, said straight edge extending downwardly to meet said first named sliding member and scale and adapted to determine a point on said linear scale which is the resultant sum of the projection of distances along said arms on said linear scale, and a compensating scale secured to said second bar adjacent the scale on the first said sliding member whereby the value of the resultant projection may be corrected with an addendum reading.

5. In a computing device, in combination, a table having a groove formed along one edge thereof, an arm pivoted in said table having a pivoted point adjacent said groove, a second pivoted arm pivoted in said table and having its pivot-point disposed in a line passing through the first said pivot-point parallel to said groove, said pivot-points being adjacently disposed and spaced a fixed distance apart sufficient to insure said arms of independent movement on said table through arcs not substantially greater than 90 degrees, an arcuate scale affixed to said table for the free end of each of said arms, a member adapted to have sliding motion disposed in said groove, a bar secured to said member and having a straight edge disposed vertically to its line of movement, a second member adapted to slide parallel to the first said member secured adjacent another edge of said table, a second bar secured to said second member and having a straight edge extending cooperatively to determine a point on said first member, said first member having a linear scale associated therewith, the "zero" of said scale being displaced from the straight edge of the first said bar a distance adapted to compensate for the fixed distance between said pivot-points, whereby said bars determine a resultant distance along said linear scale, which is the sum of the projection of distances measured along said arms when swung to various positions along said arcuate scales.

6. In a computing device, in combination, a table having a groove formed along one edge thereof, an arm pivoted in said table having a pivoted point adjacent said groove, a second pivoted arm pivoted in said table and having its pivot-point disposed in a line passing through the first said pivot-point parallel to said groove, said pivot-points being adjacently disposed and spaced a fixed distance apart sufficient to insure said arms of independent movement on said table through arcs not substantially greater than 90 degrees, an arcuate scale affixed to said table for the free end of each of said arms, a member adapted to have sliding motion disposed in said groove, a bar secured to said member and having a straight edge disposed vertically to its line of movement, a second member adapted to slide parallel to the first said member secured adjacent another edge of said table, a second bar secured to said second member and having a straight edge extending cooperatively to determine a point on said first member, said first member having a linear scale associated therewith, the "zero" of said scale being displaced from the straight edge of the first said bar a distance adapted to compensate for the fixed distance between said pivot-points, whereby said bars determine a resultant distance along said linear scale which is the sum of the projection of distances measured along said arms when swung to various positions along said arcuate scales, and a compensating scale secured to the lower end of said second bar adjacent to the first said sliding member whereby the value of the resultant on said linear scale may be corrected with an addendum reading.

In testimony whereof I affix my signature.

ARTHUR T. BOLTON.